(12) United States Patent
Liu et al.

(10) Patent No.: US 12,330,998 B2
(45) Date of Patent: Jun. 17, 2025

(54) HARD WEAR-RESISTANT POLISHED GLAZED CERAMIC TILE AND PREPARATION METHOD THEREOF

(71) Applicant: MONALISA GROUP CO., LTD, Foshan (CN)

(72) Inventors: Yijun Liu, Foshan (CN); Laifu Deng, Foshan (CN); Yuandong Yang, Foshan (CN); Xianchao Wang, Foshan (CN); Kelin Zhang, Foshan (CN)

(73) Assignee: MONALISA GROUP CO., LTD, Foshan (CN)

( * ) Notice: Subject to any disclaimer, the term of this patent is extended or adjusted under 35 U.S.C. 154(b) by 197 days.

(21) Appl. No.: 18/001,048

(22) PCT Filed: Dec. 24, 2020

(86) PCT No.: PCT/CN2020/138894
§ 371 (c)(1),
(2) Date: Dec. 7, 2022

(87) PCT Pub. No.: WO2021/258691
PCT Pub. Date: Dec. 30, 2021

(65) Prior Publication Data
US 2023/0227374 A1    Jul. 20, 2023

(30) Foreign Application Priority Data
Jun. 24, 2020   (CN) .......................... 202010587634.7

(51) Int. Cl.
C04B 41/89    (2006.01)
C03C 3/087    (2006.01)
(Continued)

(52) U.S. Cl.
CPC ............ *C04B 41/522* (2013.01); *C03C 3/087* (2013.01); *C03C 8/04* (2013.01); *C03C 10/0036* (2013.01);
(Continued)

(58) Field of Classification Search
CPC . C04B 41/522; C04B 41/0072; C04B 41/009; C04B 41/4543; C04B 41/4578;
(Continued)

(56) References Cited

FOREIGN PATENT DOCUMENTS

CN     107176790 A    9/2017
CN     107586096 A    1/2018
(Continued)

*Primary Examiner* — Christina A Johnson
*Assistant Examiner* — Xue H Liu
(74) *Attorney, Agent, or Firm* — Alleman Hall & Tuttle LLP

(57) ABSTRACT

A preparation method includes the following steps: Step (1): pressing and then drying body powder to form a green brick; Step (2): applying a ground coat on the surface of the green brick; Step (3): inkjet-printing a pattern on the surface of the green brick having the ground coat, and applying an isolation glaze; Step (4): applying a fully polished glaze on the surface of the green brick having the isolation glaze; and Step (5): drying, firing, and polishing the green brick having the fully polished glaze to obtain a hard wear-resistant polished glazed ceramic tile. The phase composition of the fired fully polished glaze is as follows: 10 to 20 percent by weight of corundum, 20 to 30 percent by weight of hyalophane, 0.5 to 1.0 percent by weight of hematite, and 50 to 68 percent by weight of amorphous phase.

6 Claims, 7 Drawing Sheets

(51) Int. Cl.
 *C03C 8/04* (2006.01)
 *C03C 10/00* (2006.01)
 *C04B 41/00* (2006.01)
 *C04B 41/45* (2006.01)
 *C04B 41/50* (2006.01)
 *C04B 41/52* (2006.01)
 *E04F 13/14* (2006.01)

(52) U.S. Cl.
 CPC ........ *C04B 41/0072* (2013.01); *C04B 41/009* (2013.01); *C04B 41/4543* (2013.01); *C04B 41/4578* (2013.01); *C04B 41/5023* (2013.01); *C04B 41/89* (2013.01); *E04F 13/142* (2013.01); *C03C 2204/00* (2013.01); *C03C 2209/02* (2013.01)

(58) Field of Classification Search
 CPC ....... C04B 41/5023; C04B 41/89; C03C 8/04; C03C 10/0036; C03C 2204/00; C03C 2209/02
 USPC ........................................................ 264/643
 See application file for complete search history.

(56) References Cited

FOREIGN PATENT DOCUMENTS

| | | |
|---|---|---|
| CN | 207483619 U | 6/2018 |
| CN | 111470884 A | 7/2020 |

A

B

HARD WEAR-RESISTANT POLISHED GLAZED CERAMIC TILE AND PREPARATION METHOD THEREOF

TECHNICAL FIELD

The present invention relates to a hard wear-resistant polished glazed ceramic tile and a preparation method thereof, which belong to the field of ceramic tile manufacturing technology.

BACKGROUND

Fully polished glaze series products are favored by consumers because of their rich pattern designs and simple and easy-to-operate processes, and therefore have replaced the market of conventional polished tiles in a large proportion. However, with the increase of service time, the scratches and degree of abrasion on the surface of fully polished glaze series products are more visible than those on the surface of polished tiles, and even some public places have to be redecorated due to excessive abrasion and defects of the glaze surface. At present, fully polished glaze formulas of fully polished glaze ceramic tiles on the market mainly adopt a low-aluminum and high-potassium-and-sodium system. The amorphous phase content formed by a glaze layer formed by firing the polished glaze of such a formula system is high, while the content of crystalline substances with high hardness is low. In addition, the bond strengths of Na—O and K—O in the polished glaze of the high-potassium-and-sodium system are far lower than those of Ca—O and Mg—O. Therefore, in order to increase the hardness and abrasion resistance of the glaze surface, it is necessary to reduce the content of alkali metals and adopt part of alkaline-earth metals for replacement. At present, the waterfall method is generally adopted as a glazing method for the aforementioned polished glaze. The amount of glaze applied by the waterfall method is large, causing the glaze material cost to increase to a certain degree, and in addition, the increase of the depth of polishing will also decrease its hardness and abrasion resistance to a certain degree. In consideration of abrasion resistance, the proportions of fully polished glaze series products applied in construction and on the market have been reduced. Therefore, it is urgent to improve the abrasion resistance of fully polished glaze ceramic tiles, so as to expand the proportions of fully polished glaze ceramic tiles applied in construction and on the market.

Technical Problem

Aiming at the aforementioned problem, the present invention provides a hard wear-resistant polished glazed ceramic tile and a preparation method thereof, which achieves a good improvement in the abrasion resistance of fully polished glaze by adjusting the formula of fully polished glaze and the glazing method.

Technical Solution

In a first aspect, the present invention provides a preparation method for a hard wear-resistant polished glazed ceramic tile, including the following steps:
Step (1): pressing and then drying body powder to form a green brick;
Step (2): applying a ground coat on the surface of the green brick;
Step (3): inkjet-printing a pattern on the surface of the green brick having the ground coat, and applying an isolation glaze;
Step (4): applying a fully polished glaze on the surface of the green brick having the isolation glaze; and
Step (5): drying, firing, and polishing the green brick having the fully polished glaze to obtain a hard wear-resistant polished glazed ceramic tile.

The phase composition of the fired fully polished glaze is 10 to 20 percent by weight of corundum, 20 to 30 percent by weight of hyalophane, 0.5 to 1.0 percent by weight of hematite, and 50 to 68 percent by weight of amorphous phase.

Preferably, the chemical composition of the fully polished glaze includes 42 to 50 percent by weight of $SiO_2$, 21 to 25 percent by weight of $Al_2O_3$, 0.16 to 0.46 percent by weight of $Fe_2O_3$, 0.10 to 0.20 percent by weight of $TiO_2$, 8.5 to 10.5 percent by weight of CaO, 4.0 to 6.0 percent by weight of MgO, 0.5 to 1.5 percent by weight of $K_2O$, 0.5 to 1.5 percent by weight of $Na_2O$, 4.5 to 7.5 percent by weight of ZnO, 6.0 to 10.0 percent by weight of BaO, 0.5 to 2.0 percent by weight of $ZrO_2$, and 4.0 to 6.0 percent by weight of loss on ignition.

Preferably, the method of applying the fully polished glaze is silk-screen printing. Preferably, the specific weight of the fully polished glaze is 1.50 $g/cm^3$ to 1.70 $g/cm^3$, and the amount of the fully polished glaze applied is 90 $g/m^2$ to 140 $g/m^2$.

Preferably, the chemical composition of the isolation glaze includes 42 to 50 percent by weight of $SiO_2$, 21 to 25 percent by weight of $Al_2O_3$, 0.16 to 0.46 percent by weight of $Fe_2O_3$, 0.10 to 0.20 percent by weight of $TiO_2$, 10.0 to 12.0 percent by weight of CaO, 1.0 to 2.0 percent by weight of MgO, 0.5 to 1.5 percent by weight of $K_2O$, 1.5 to 2.5 percent by weight of $Na_2O$, 4.5 to 7.5 percent by weight of ZnO, 6.0 to 10.0 percent by weight of BaO, and 4.0 to 6.0 percent by weight of loss on ignition.

Preferably, the method of applying the isolation glaze is silk-screen printing. Preferably, the specific weight of the isolation glaze is 1.25 $g/cm^3$ to 1.35 $g/cm^3$. More preferably, the silk-screen printing uses a 120-to-180-mesh screen plate.

Preferably, the chemical composition of the ground coat includes 55 to 60 percent by weight of $SiO_2$, 21 to 24 percent by weight of $Al_2O_3$, 0.16 to 0.46 percent by weight of $Fe_2O_3$, 0.15 to 0.25 percent by weight of $TiO_2$, 0.1 to 0.3 percent by weight of CaO, 0.1 to 0.3 percent by weight of MgO, 4.0 to 5.0 percent by weight of $K_2O$, 2.0 to 3.0 percent by weight of $Na_2O$, 6.0 to 10.0 percent by weight of $ZrO_2$, and 3.0 to 4.0 percent by weight of loss on ignition.

Preferably, the method of applying the ground coat is spray glazing. Preferably, the specific weight of the ground coat is 1.40 $g/cm^3$ to 1.45 $g/cm^3$, and the amount of the ground coat applied is 400 $g/m^2$ to 550 $g/m^2$.

Preferably, the highest firing temperature is 1,210° C. to 1,230° C., and the firing period is 60 to 70 minutes.

Preferably, in step (1), the drying duration is 1 to 1.5 hours, and the moisture content of the dried green brick is 0.3 to 0.5 percent by weight; in step (5), the drying temperature is 100° C. to 150° C., and the moisture content of the dried green brick is controlled at less than 0.9 percent by weight.

In a second aspect, the present invention further provides the hard wear-resistant polished glazed ceramic tile obtained by the preparation method according to any of the above.

Beneficial Effect

The present invention achieves a good improvement in the abrasion resistance of fully polished glaze ceramic tiles by adjusting the formula of fully polished glaze and the glazing method.

Figure 4:
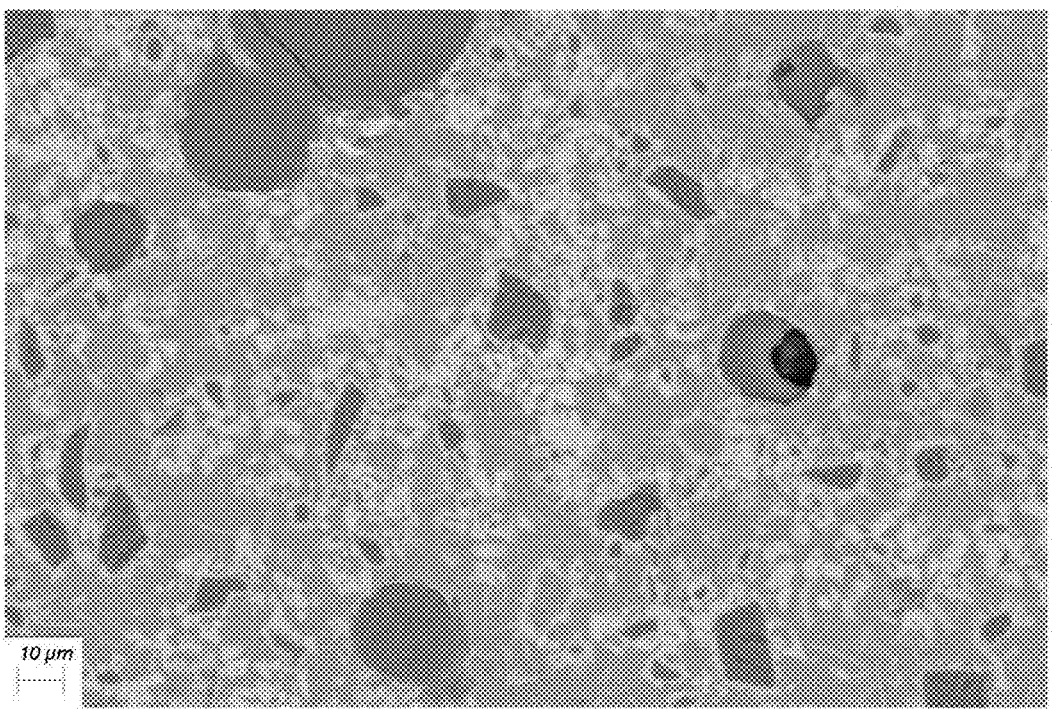
Figure 4:
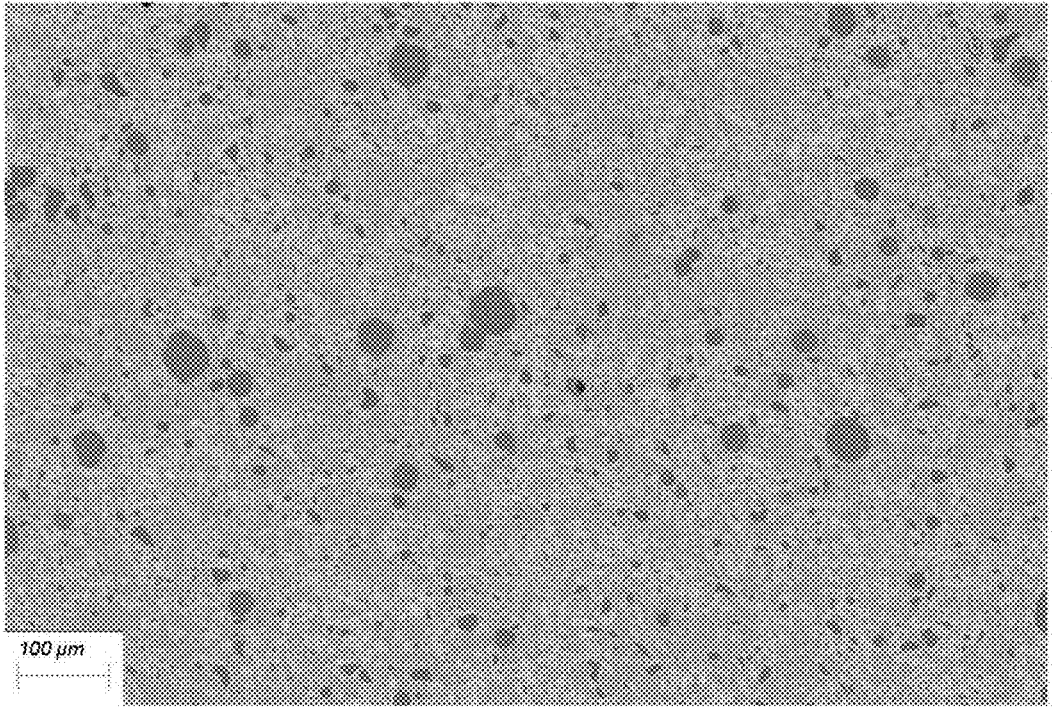

A and B in FIG. 4 are glaze crystal morphology images of the polished hard wear-resistant polished glazed ceramic tile according to Example 1 of the present invention under the different magnifications of an electron microscope.

Figure 5:
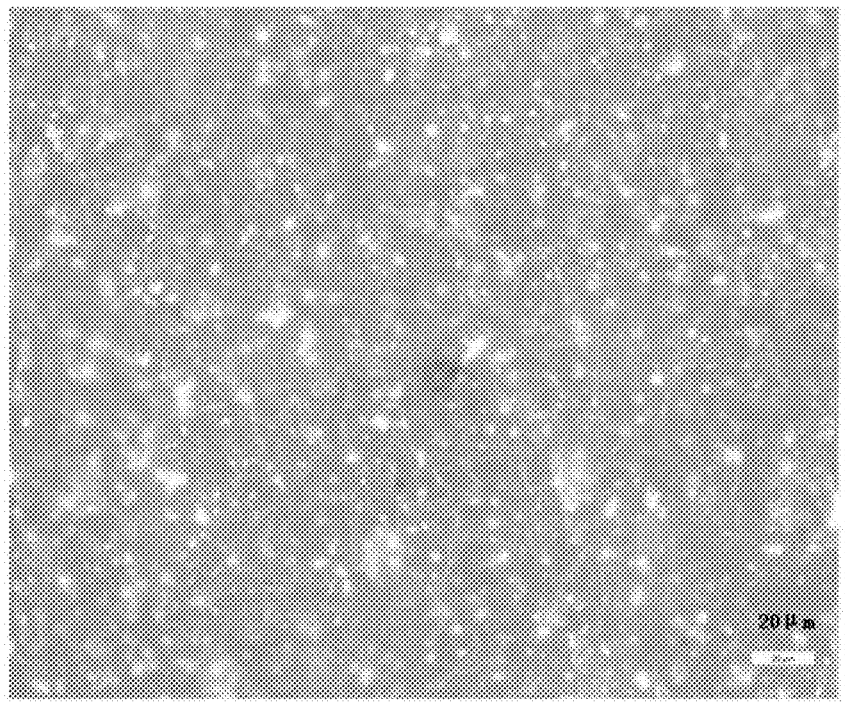
Figure 5:
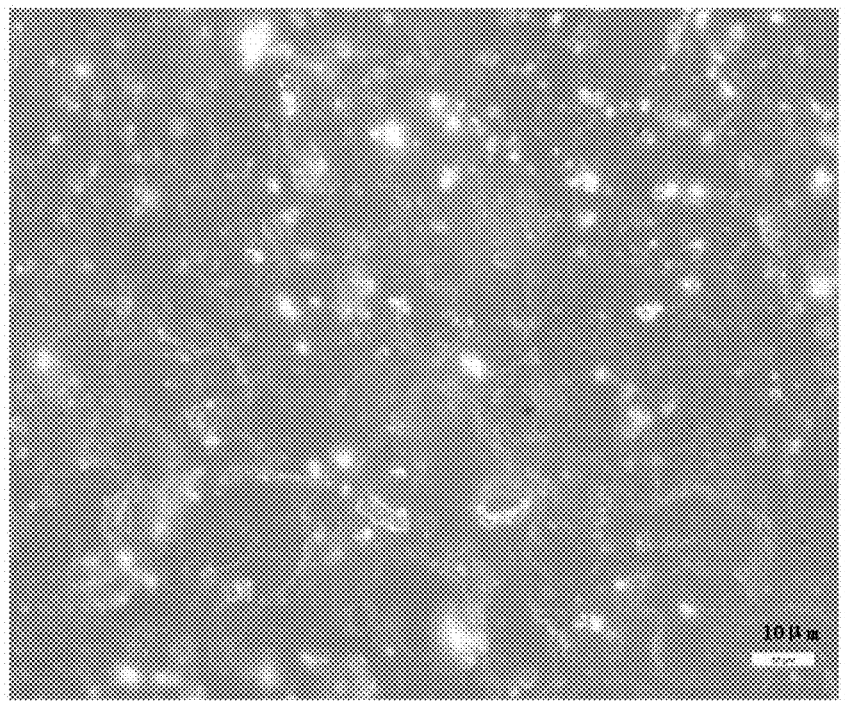
Figure 6:
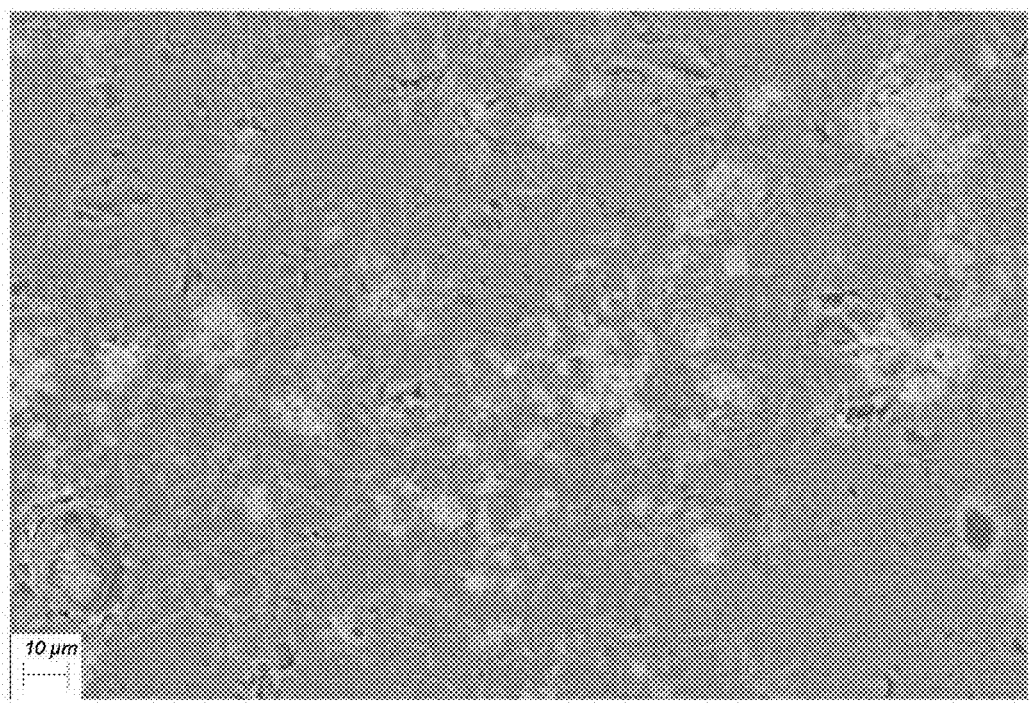
Figure 7:
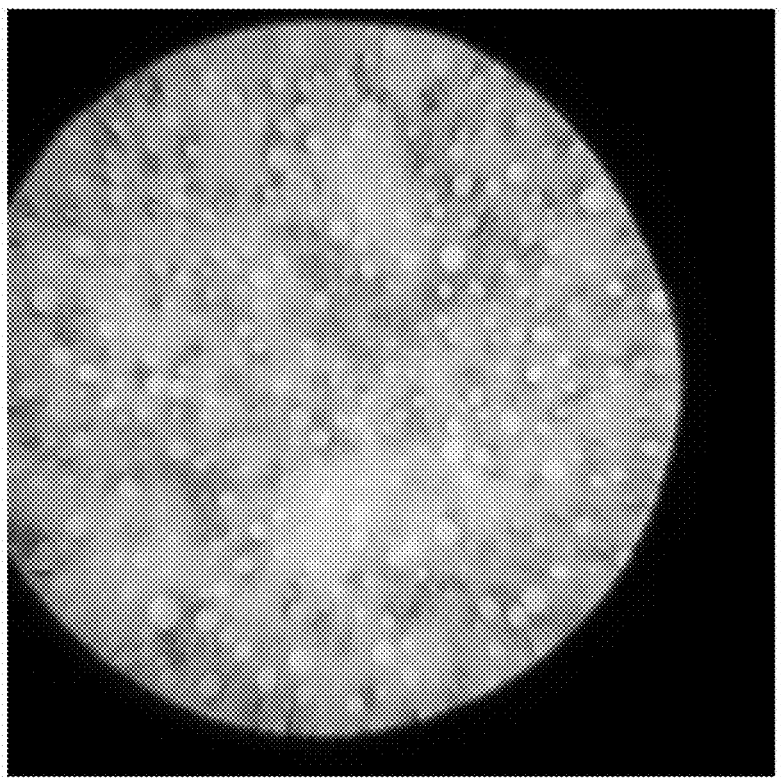
Figure 8:
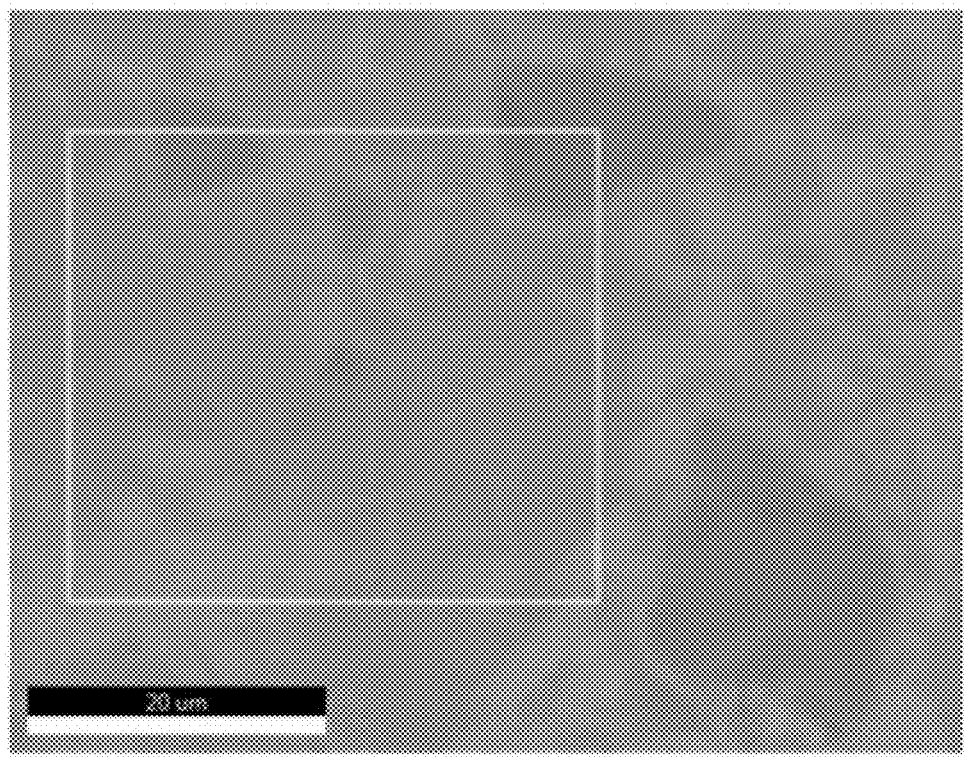
Figure 8:
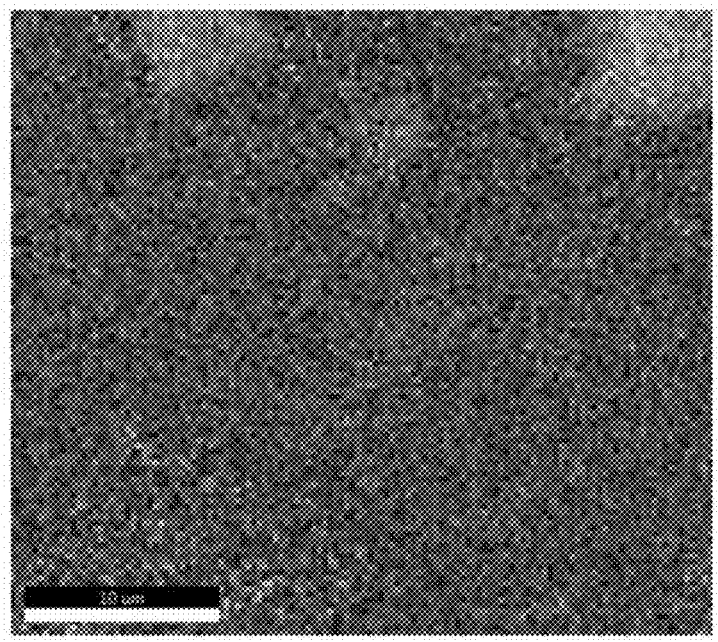
Figure 8:
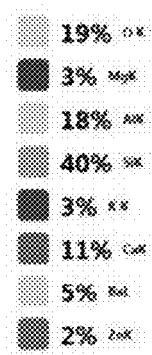
Figure 9:
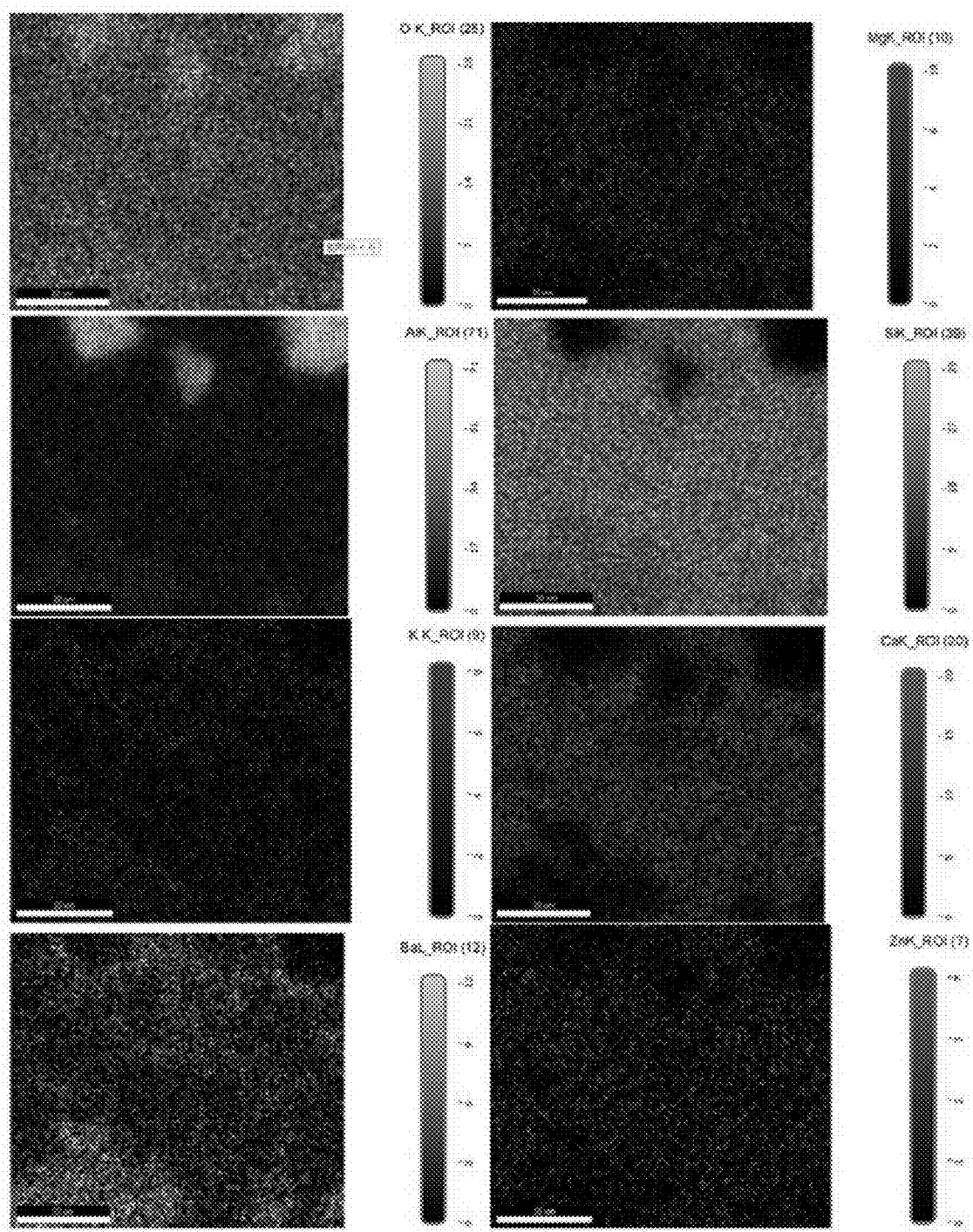

A and B in FIG. 5 are glaze crystal morphology images of the fully polished glaze surface of the polished hard wear-resistant polished glazed ceramic tile according to Example 1 of the present invention under the different magnifications of an optical microscope, and it can be seen that there are still a lot of crystals in the polished glaze surface, which provide high hardness and good abrasion resistance for the glaze surface;

FIG. 6 is a crystal morphology image of a fully polished glaze ceramic tile of Comparative Example 1 under the electron microscope, and it can be seen that the crystals produced by this fully polished glaze formula are in disorder and that the total number of the crystals is small, so the hardness and abrasion resistance of the glaze surface are poor;

FIG. 7 shows an effect picture of pores of a fully polished glaze ceramic tile of Comparative Example 2 under a manual magnifier (magnification: 100×), and it can be seen that the amount of glaze applied by the waterfall method is large, which causes the increase of the thickness of the glaze layer, deteriorates the transparency of the glaze surface, and makes it difficult to exhaust gas in the glaze layer, leading to a lot of pores after polishing;

A in FIG. 8 is an energy spectrum analysis image of the fully polished glaze used in Example 1 of the present invention under the electron microscope, and B in FIG. 8 is a backscattered electron image and a result table of a component analysis test after sampling part of the area (corresponding position in A); and FIG. 9 is backscattered electron images of O, Mg, Al, Si, K, Ca, Ba, and Zn elements in the fully polished glaze used in Example 1 of the present invention.

DETAILED DESCRIPTION OF PREFERRED EMBODIMENTS

The present invention will be further illustrated by the following embodiments, and it should be understood that the following embodiments are only used to illustrate the present invention rather than to limit it. Unless otherwise specified, each percentage refers to a percentage by weight.

Figure 1:
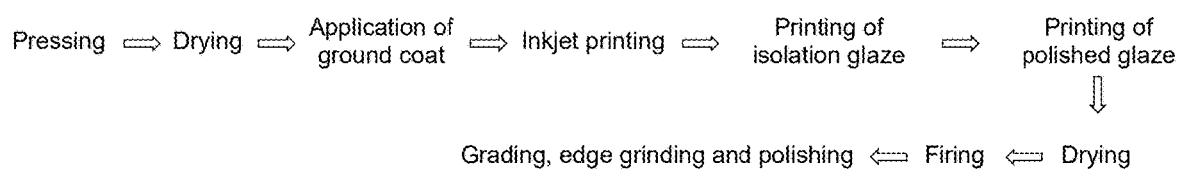
FIG. 1 is a flowchart of the preparation of a hard wear-resistant polished glazed ceramic tile according to an embodiment of the present invention.
Figure 2:
FIG. 2 is an effect picture of the surface of the hard wear-resistant polished glazed ceramic tile according to Example 1 of the present invention.
Figure 3:
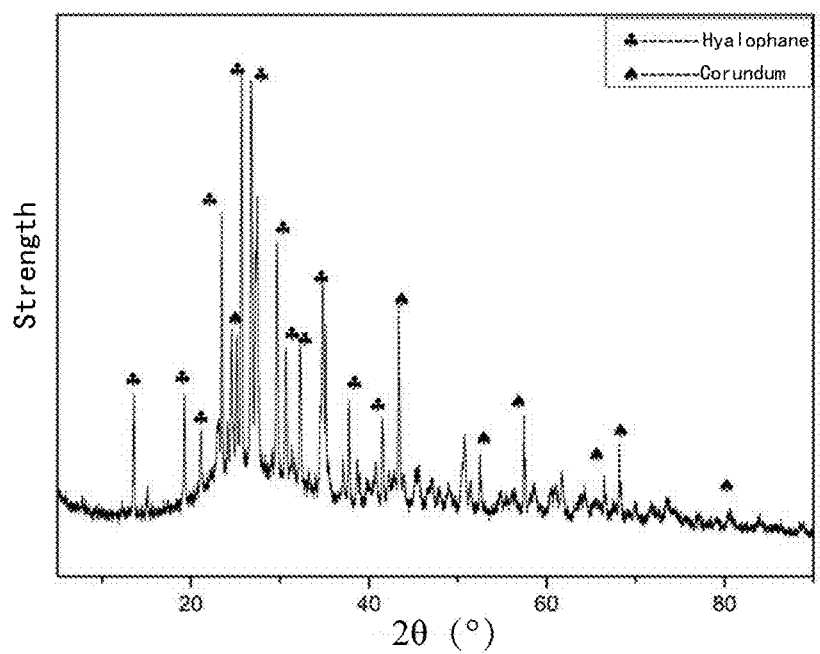
FIG. 3 is an X-ray diffraction (XRD) graph of the surface of the polished hard wear-resistant polished glazed ceramic tile according to Example 1 of the present invention.

A preparation method for a hard wear-resistant polished glazed ceramic tile according to the present invention will be illustrated below with reference to FIG. 1.

Body powder is shaped to obtain a green brick. The body powder may be dry-pressed by a press to form the green brick. The composition of the body powder is not limited, and conventional ceramic tile body powder in the art may be adopted. For example, the chemical composition of the body powder includes 60.0 to 70.0 percent by weight of $SiO_2$, 19.0 to 25.0 percent by weight of $Al_2O_3$, 0.5 to 1.5 percent by weight of $Fe_2O_3$, 0.2 to 0.5 percent by weight of $TiO_2$, 0.2 to 0.8 percent by weight of CaO, 0.3 to 0.8 percent by weight of MgO, 2.0 to 4.0 percent by weight of $K_2O$, 1.50 to 3.5 percent by weight of $Na_2O$, and 4.0 to 6.0 percent by weight of loss on ignition.

The green brick is dried. The moisture content of the dried green brick is controlled at 0.3 to 0.5 percent by weight. The duration of the aforementioned drying may be 1 to 1.5 hours.

A ground coat is applied on the surface of the dried green brick. The ground coat mainly plays the role of covering the base color and defects of the body, helping exhaust gas in polished glaze, and reducing pores after polishing.

In some embodiments, the chemical composition of the ground coat may include 55 to 60 percent by weight of $SiO_2$, 21 to 24 percent by weight of $Al_2O_3$, 0.16 to 0.46 percent by weight of $Fe_2O_3$, 0.15 to 0.25 percent by weight of $TiO_2$, 0.1 to 0.3 percent by weight of CaO, 0.1 to 0.3 percent by weight of MgO, 4.0 to 5.0 percent by weight of $K_2O$, 2.0 to 3.0 percent by weight of $Na_2O$, 6.0 to 10.0 percent by weight of $ZrO_2$, and 3.0 to 4.0 percent by weight of loss on ignition.

The method of applying the ground coat may be spray glazing. For example, the specific weight of the ground coat may be 1.40 $g/cm^3$ to 1.45 $g/cm^3$, and the amount of the ground coat applied may be 400 $g/m^2$ to 550 $g/m^2$.

A pattern is inkjet-printed on the surface of the green brick having the ground coat. The color and design of the inkjet-printed pattern vary according to layout effects.

An isolation glaze is applied on the surface of the green brick after inkjet printing. The purpose of applying the isolation glaze is to contribute to color development and the reduction of yellow edges of the product after polishing.

In some embodiments, the chemical composition of the isolation glaze includes 42 to 50 percent by weight of $SiO_2$, 21 to 25 percent by weight of $Al_2O_3$, 0.16 to 0.46 percent by weight of $Fe_2O_3$, 0.10 to 0.20 percent by weight of $TiO_2$, 10.0 to 12.0 percent by weight of CaO, 1.0 to 2.0 percent by weight of MgO, 0.5 to 1.5 percent by weight of $K_2O$, 1.5 to 2.5 percent by weight of $Na_2O$, 4.5 to 7.5 percent by weight of ZnO, 6.0 to 10.0 percent by weight of BaO, and 4.0 to 6.0 percent by weight of loss on ignition.

The method of applying the isolation glaze may be silk-screen printing. Silk-screen printing can effectively control the amount of the isolation glaze applied and ensure the uniformity of glazing. The specific weight of the isolation glaze may be 1.25 $g/cm^3$ to 1.35 $g/cm^3$. The amount of the isolation glaze applied may be 20 $g/m^2$ to 30 $g/m^2$. If the amount of the isolation glaze applied is excessive, the abrasion resistance of fully polished glaze will be decreased to a certain degree. This is mainly because the isolation glaze is relatively low in temperature and contains relatively high sodium content, with the bond strength of Na—O being much lower than that of Mg—O. As a result, if the amount of the isolation glaze applied is excessive, it will react with the fully polished glaze to produce too much amorphous phase, reducing the abrasion resistance. According to the present invention, the objective of controlling the amount of the isolation glaze applied is achieved by using screen plates with different numbers of meshes for printing and adjusting the specific weight of the isolation glaze. In some embodiments, silk-screen printing may use a 120-to-180-mesh screen plate.

The melting temperature of the aforementioned isolation glaze is 1,150° C. to 1,170° C., which can ensure the high hardness and abrasion resistance of the glaze surface and a good porosity of the glaze surface and prevent the phenomenon of yellow edges after polishing. Preferably, the melting temperature of the isolation glaze is 10° C. to 20° C. lower than that of the fully polished glaze, which can improve the color development of the glaze surface, reduce pores after polishing, and prevent the pit defect of the fully polished glaze.

A fully polished glaze is applied on the surface of the green brick having the isolation glaze. In some embodiments, the chemical composition of the fully polished glaze includes 42 to 50 percent by weight of $SiO_2$, 21 to 25 percent by weight of $Al_2O_3$, 0.16 to 0.46 percent by weight of $Fe_2O_3$, 0.10 to 0.20 percent by weight of $TiO_2$, 8.5 to 10.5 percent by weight of CaO, 4.0 to 6.0 percent by weight of MgO, 0.5 to 1.5 percent by weight of $K_2O$, 0.5 to 1.5 percent by weight of $Na_2O$, 4.5 to 7.5 percent by weight of ZnO, 6.0 to 10.0 percent by weight of BaO, 0.5 to 2.0 percent by weight of $ZrO_2$, and 4.0 to 6.0 percent by weight of loss on ignition.

Through the combination of an electron microscope, energy spectrum analysis and X-ray diffraction (XRD) analysis (FIG. 3, FIG. 4, FIG. 8, and FIG. 9), it can be known that the black spots are corundum and the columnar and acicular crystals are hyalophane. In addition, according to an XRD quantitative analysis, the phase composition of the fired fully polished glaze is as follows: 10 to 20 percent by weight of corundum, 20 to 30 percent by weight of hyalophane, 0.5 to 1.0 percent by weight of hematite, and 50 to 68 percent by weight of amorphous phase.

The composition of the aforementioned fully polished glaze may include 9.0 to 15.0 percent by weight of corundum, 8.0 to 13.0 percent by weight of quartz, 15.0 to 20.0 percent by weight of wollastonite, 5.0 to 10.0 percent by weight of calcined talc, 8 to 13 percent by weight of potash feldspar, 1.0 to 5.0 percent by weight of albite, 4 to 8 percent by weight of zinc oxide, 8.0 to 13.0 percent by weight of kaolin, 8.0 to 13.0 percent by weight of barium carbonate, 0.5 to 2.0 percent by weight of zirconia, and 10.0 to 15.0 percent by weight of cordierite.

Since the contents of corundum and cordierite in the fully polished glaze formula are high and barium carbonate is added in the formula, more hyalophane crystals can be formed in the process of firing the fully polished glaze. Moreover, the alkaline-earth metals, calcium and magnesium, are used to replace part of potassium and sodium contents in the formula (this is mainly because the bond strengths of K—O and Na—O are much lower than those of Ca—O and Mg—O), which can effectively increase the hardness and abrasion resistance of the glaze surface. In addition, a small amount of zirconia (nucleating agent) is introduced to promote the formation of hyalophane crystals, so as to achieve the objective of high hardness and high abrasion resistance.

In some embodiments, the preparation method of the fully polished glaze may include weighing the aforementioned materials according to the contents in the formula, then grinding and sieving the materials with a 200-to-250-mesh standard sieve to obtain granular material, and ball-milling the granular material and water to obtain a glaze slurry. The weight ratio of the granular material to the water may be 100:50. The granular material is ball-milled until the fineness is 0.6 to 1.0 percent by weight of residue left on a 325-mesh standard sieve. The flow velocity of the aforementioned fully polished glaze may be 80 to 90 seconds. The glaze slurry is dried, powdered and sieved to obtain a fully polished glaze powder.

The method of applying the fully polished glaze may be silk-screen printing. The waterfall method is not suitable for the present invention, mainly because the amount of glaze applied by the waterfall method is large, which causes the increase in the thickness of the glaze layer, deteriorates the transparency of the glaze surface, and makes it difficult to exhaust gas in the glaze layer, leading to the increase in the number of pores after polishing. The thickness of a fully polished glaze layer formed by the applied fully polished glaze may be 0.15 mm to 0.30 mm. The number of meshes of silk-screen printing may be 80 to 120. For example, technological parameters of the application of the fully polished glaze may be as follows: a 100-mesh screen plate which has been thickened three times is adopted to perform printing once.

The specific weight of the fully polished glaze may be 1.50 $g/cm^3$ to 1.70 $g/cm^3$. The amount of the fully polished glaze applied may be 90 $g/m^2$ to 140 $g/m^2$, which can ensure the hardness and abrasion resistance of the glaze surface as well as good transparency and color development.

Before adjustment, the waterfall method was adopted to apply the fully polished glaze, which resulted in a relatively thicker fully polished glaze and a relatively thinner body-glaze intermediate layer, leading to the decrease of the hardness and abrasion resistance of the glaze surface. This is mainly because the crystallization of the fully polished glaze layer mainly occurs in the middle and upper layers of the glaze surface and the interface with the ground coat. If the amount of the glaze applied is excessive, the thickness of the glaze layer will increase, the transparency of the glaze surface will become worse, and it will be difficult to exhaust gas in the glaze layer, leading to the increase of the number of pores after polishing. Therefore, correspondingly, a higher depth of polishing is required in order to achieve better transparency and mirror effect. With the increase of the depth of polishing, the abrasion-resistant crystals in the middle and upper layers are polished off, exposing more amorphous phase, which leads to the decrease of the hardness and abrasion resistance of the glaze surface.

After the glazing method for fully polished glaze is adjusted, silk-screen printing can better control the amount and uniformity of the glaze applied. Moreover, the less the amount of the glaze applied, the thinner the glaze layer, the thicker the body-glaze intermediate layer, and the better the hardness and abrasion resistance of the glaze surface. In addition, the thin glaze layer is also conducive to the exhaustion of gas, reducing the pores after polishing, so the hardness and abrasion resistance of the glaze surface are increased.

The green brick having the fully polished glaze is dried. The drying temperature may be 100° C. to 150° C., and the moisture content after drying is controlled at less than 0.9 percent by weight. The dried body is fired. The highest firing temperature may be 1,210° C. to 1,230° C., and the firing period may be 60 to 70 minutes. Since the Mohs hardness of corundum is 9 and the Mohs hardness of hyalophane is 6 to 6.5, if the glaze surface contains crystals with high hardness, the glaze surface will also show high Mohs hardness and abrasion resistance. Theoretically, the higher the content of crystals with high hardness, the better its hardness and abrasion resistance. In an appropriate range, the longer the firing period, the more favorable it is for crystallization. A long duration in a high-temperature zone can make the materials fully melt and react, and a long period in a cooling zone can ensure that more crystals are formed. Therefore, in order to promote crystallization, the present invention not only adjusts the formula and glazing method of the fully polished glaze, but also adjusts and controls a firing system to cooperate in the promotion of crystallization. The longer the firing period, the more sufficiently the oxides in the glaze melt, and the longer the cooling and temperature-keeping time, the more crystals are formed. In some embodiments, the duration in the high-temperature zone in the firing system according to the present invention is about 12 to 20 minutes, such as 15 minutes. The temperature of this high-temperature zone is 1,210° C. to 1,230° C.

The fired ceramic tile is polished, ground at the edges and graded to obtain the fully polished glaze ceramic tile.

The fully polished glaze ceramic tile prepared by the present invention has high hardness and good abrasion resistance. The Mohs hardness is up to 5.5 to 6, and in terms of abrasion resistance, light-colored products reach class 5 (12,000 revolutions). Since the abrasion resistance testing method is carried out according to GB/T 3810.6-2016 and abrasions are observed by naked eyes (relatively speaking, the abrasions on the glaze surface of dark tiles will be much more visible and easier to be observed), the abrasion resistance of light tiles is usually higher than that of dark tiles when judged.

DETAILED DESCRIPTION OF EMBODIMENTS

An example will be taken to further illustrate the present invention in detail below. It should also be understood that the following example is only used to further illustrate the present invention rather than to limit the protection scope of the present invention. All non-essential improvements and adjustments which are made by those skilled in the art according to the above contents of the present invention shall fall within the protection scope of the present invention. The specific technological parameters of the following example are merely one example in an appropriate range, that is, those skilled in the art can make choices within the appropriate range through the description herein, but the choices are not limited to the specific values of the following example.

Example 1

(1) A body powder was dry-pressed by a press;
(2) the body powder was dried for 1 to 1.5 hours to form a green brick, and the moisture content of the dried green brick was 0.3 to 0.5 percent by weight;
(3) a ground coat was sprayed on the surface of the dried green brick, the specific weight of the ground coat was 1.40 g/cm$^3$ to 1.45 g/cm$^3$, and the amount of the ground coat applied was 400 g/m$^2$ to 550 g/m$^2$;
(4) a pattern was inkjet-printed on the surface of the green brick having the ground coat;
(5) an isolation glaze was applied on the surface of the green brick having the inkjet-printed pattern by 140-mesh silk-screen printing, the specific weight of the isolation glaze was 1.30 g/cm$^3$, and the amount of the isolation glaze applied was 20 g/m$^2$ to 30 g/m$^2$;
(6) after the isolation glaze was printed, a fully polished glaze was printed by using a 100-mesh screen plate which has been thickened three times, the specific weight of the fully polished glaze was 1.56 g/cm$^3$, the amount of the fully polished glaze applied was 100 g/m$^2$, and the chemical composition of the fully polished glaze included 42 to 50 percent by weight of $SiO_2$, 21 to 25 percent by weight of $Al_2O_3$, 0.16 to 0.46 percent by weight of $Fe_2O_3$, 0.10 to 0.20 percent by weight of $TiO_2$, 8.5 to 10.5 percent by weight of CaO, 4.0 to 6.0 percent by weight of MgO, 0.5 to 1.5 percent by weight of $K_2O$, 0.5 to 1.5 percent by weight of $Na_2O$, 4.5 to 7.5 percent by weight of ZnO, 6.0 to 10.0 percent by weight of BaO, 0.5 to 2.0 percent by weight of $ZrO_2$, and 4.0 to 6.0 percent by weight of loss on ignition;
(7) the green brick having the printed fully polished glaze was dried at a drying temperature of 100° C. to 150° C., so that the moisture content of the dried green brick was controlled at less than 0.9 percent by weight;
(8) the dried green brick was fired at the highest firing temperature of 1,220° C. for a firing period of 60 minutes; and
(9) the obtained product was polished, ground at the edges and graded.

The fully polished glaze ceramic tile prepared in this example has high hardness (Mohs hardness: 5.5 to 6.0) and good abrasion resistance (class 5, 12,000 revolutions).

Comparative Example 1

(1) A body powder was dry-pressed by a press;
(2) the body powder was dried for 1 to 1.5 hours to form a green brick, and the moisture content of the dried green brick was 0.3 to 0.5 percent by weight;
(3) a ground coat was sprayed on the surface of the dried green brick, the specific weight of the ground coat was 1.40 g/cm$^3$ to 1.45 g/cm$^3$, and the amount of the ground coat applied was 400 g/m$^2$ to 550 g/m$^2$;
(4) a pattern was inkjet-printed on the surface of the green brick having the ground coat;
(5) an isolation glaze was applied on the surface of the green brick having the inkjet-printed pattern by 140-mesh silk-screen printing, the specific weight of the isolation glaze was 1.30 g/cm$^3$, and the amount of the isolation glaze applied was 20 g/m$^2$ to 30 g/m$^2$;
(6) after the isolation glaze was printed, conventional fully polished glaze was applied by adopting the bell glazing method, the specific weight of the fully polished glaze was 1.80 g/cm$^3$, the amount of the fully polished glaze applied was 450 g/m$^2$ to 600 g/m$^2$, and the chemical composition of the fully polished glaze included: 43.0 to 50.0 percent by weight of $SiO_2$, 12.0 to 16.0 percent by weight of $Al_2O_3$, 0.1 to 0.5 percent by weight of $Fe_2O_3$, 0.1 to 0.3 percent by weight of $TiO_2$, 7.0 to 9.0 percent by weight of CaO, 3.5 to 4.5 percent by weight of MgO, 3.5 to 4.5 percent by weight of $K_2O$, 1.5 to 2.5 percent by weight of $Na_2O$, 3.0 to 5.0 percent by weight of ZnO, 7.0 to 12.0 percent by weight of BaO, and 6.0 to 9.0 percent by weight of loss on ignition;
(7) the green brick having the fully polished glaze was dried at a drying temperature of 100° C. to 150° C., so that the moisture content of the dried green brick was controlled at less than 0.9 percent by weight;
(8) the dried green brick was fired at the highest firing temperature of 1,220° C. for a firing period of 60 minutes; and
(9) the obtained product was polished, ground at the edges and graded.

The phase composition of the fired fully polished glaze surface is as follows: 1 to 3 percent by weight of corundum, 3 to 5 percent by weight of hyalophane, 3 to 5 percent by weight of bytownite, 0.5 to 2 percent by weight of hematite, and 85 to 90 percent by weight of amorphous phase.

The fully polished glaze ceramic tile prepared in Comparative Example 1 has a Mohs hardness of 4.5 and abrasion resistance of class 3 (2,100 revolutions). It can be known from the comparison between FIG. 4 and FIG. 6 that the crystals of the polished glaze surface in FIG. 6 are in disorder and the quantity of corundum is small, so the hardness and abrasion resistance are poor.

Comparative Example 2

(1) A body powder was dry-pressed by a press;
(2) the body powder was dried for 1 to 1.5 hours to form a green brick, and the moisture content of the dried green brick was 0.3 to 0.5 percent by weight;
(3) a ground coat was sprayed on the surface of the dried green brick, the specific weight of the ground coat was 1.40 g/cm$^3$ to 1.45 g/cm$^3$, and the amount of the ground coat applied was 400 g/m$^2$ to 550 g/m$^2$;
(4) a pattern was inkjet-printed on the surface of the green brick having the ground coat;
(5) an isolation glaze was applied on the surface of the green brick having the inkjet-printed pattern by 140-mesh silk-screen printing, the specific weight of the isolation glaze was 1.30 g/cm$^3$, and the amount of the isolation glaze applied was 20 g/m$^2$ to 30 g/m$^2$;
(6) after the isolation glaze was printed, fully polished glaze was applied by adopting the bell glazing method, the specific weight of the fully polished glaze was 1.80 g/cm$^3$, the amount of the fully polished glaze applied was 450 g/m$^2$ to 600 g/m$^2$, and the chemical composition of the fully polished glaze included 42 to 50 percent by weight of $SiO_2$, 21 to 25 percent by weight of $Al_2O_3$, 0.16 to 0.46 percent by weight of $Fe_2O_3$, 0.10 to 0.20 percent by weight of $TiO_2$, 8.5 to 10.5 percent by weight of CaO, 4.0 to 6.0 percent by weight of MgO, 0.5 to 1.5 percent by weight of $K_2O$, 0.5 to 1.5 percent by weight of $Na_2O$, 4.5 to 7.5 percent by weight of ZnO, 6.0 to 10.0 percent by weight of BaO, 0.5 to 2.0 percent by weight of $ZrO_2$, and 4.0 to 6.0 percent by weight of loss on ignition;
(7) the green brick having the fully polished glaze was dried at a drying temperature of 100° C. to 150° C., so that the moisture content of the dried green brick was controlled at less than 0.9 percent by weight;
(8) the dried green brick was fired at the highest firing temperature of 1,220° C. for a firing period of 60 minutes; and
(9) the obtained product was polished, ground at the edges and graded.

The fully polished glaze ceramic tile prepared in Comparative Example 2 is poor in transparency of the glaze surface with a lot of pores, and has a Mohs hardness of 5.0 and abrasion resistance of class 4 (6,000 revolutions). The slightly poor hardness and abrasion resistance of the obtained ceramic tile indicate that the waterfall method is not suitable for the present invention, mainly because the amount of glaze applied by the waterfall method is large, which causes the increase of the thickness of the glaze layer, deteriorates the transparency of the glaze surface, and makes it difficult to exhaust gas in the glaze layer, leading to the increase of the number of pores after polishing, as shown in FIG. 7.

What is claimed is:

1. A preparation method for a hardened wear-resistant polished glazed ceramic tile, comprising the following steps:
    Step (1): pressing and then drying body powder to form a green brick;
    Step (2): applying a ground coat on a surface of the green brick;
    Step (3): inkjet-printing a pattern on the surface of the green brick having the ground coat, and applying an isolation glaze, a chemical composition of the isolation glaze comprising 42 to 50 percent by weight of $SiO_2$, 21 to 25 percent by weight of $Al_2O_3$, 0.16 to 0.46 percent by weight of $Fe_2O_3$, 0.10 to 0.20 percent by weight of $TiO_2$, 10.0 to 12.0 percent by weight of CaO, 1.0 to 2.0 percent by weight of MgO, 0.5 to 1.5 percent by weight of $K_2O$, 1.5 to 2.5 percent by weight of $Na_2O$, 4.5 to 7.5 percent by weight of ZnO, 6.0 to 10.0 percent by weight of BaO, and 4.0 to 6.0 percent by weight of loss on ignition;
    Step (4): applying a fully polished glaze on the surface of the green brick having the isolation glaze, a chemical composition of the fully polished glaze comprising 42 to 50 percent by weight of $SiO_2$, 21 to 25 percent by weight of $Al_2O_3$, 0.16 to 0.46 percent by weight of $Fe_2O_3$, 0.10 to 0.20 percent by weight of $TiO_2$, 8.5 to 10.5 percent by weight of CaO, 4.0 to 6.0 percent by weight of MgO, 0.5 to 1.5 percent by weight of $K_2O$, 0.5 to 1.5 percent by weight of $Na_2O$, 4.5 to 7.5 percent by weight of ZnO, 6.0 to 10.0 percent by weight of BaO, 0.5 to 2.0 percent by weight of $ZrO_2$, and 4.0 to 6.0 percent by weight of loss on ignition; and
    Step (5): drying, firing, and polishing the green brick having the fully polished glaze to obtain a hardened wear-resistant polished glazed ceramic tile,
    wherein a phase composition of the fired fully polished glaze is 10 to 20 percent by weight of corundum, 20 to 30 percent by weight of hyalophane, 0.5 to 1.0 percent by weight of hematite, and 50 to 68 percent by weight of amorphous phase.

2. The preparation method of claim 1, wherein a chemical composition of the ground coat comprises 55 to 60 percent by weight of $SiO_2$, 21 to 24 percent by weight of $Al_2O_3$, 0.16 to 0.46 percent by weight of $Fe_2O_3$, 0.15 to 0.25 percent by weight of $TiO_2$, 0.1 to 0.3 percent by weight of CaO, 0.1 to 0.3 percent by weight of MgO, 4.0 to 5.0 percent by weight of $K_2O$, 2.0 to 3.0 percent by weight of $Na_2O$, 6.0 to 10.0 percent by weight of $ZrO_2$, and 3.0 to 4.0 percent by weight of loss on ignition.

3. The preparation method of claim 1, wherein the method of applying the ground coat is spray glazing, a specific weight of the ground coat is 1.40 g/cm$^3$ to 1.45 g/cm$^3$, and the amount of the ground coat applied is 400 g/m$^2$ to 550 g/m$^2$.

4. The preparation method of claim 1, wherein a highest firing temperature is 1,210° C. to 1,230° C., and a firing period is 60 to 70 minutes.

5. The preparation method of claim 1, wherein in step (1), a drying duration is 1 to 1.5 hours, and a moisture content of the dried green brick is 0.3 to 0.5 percent by weight; in step (5), a drying temperature is 100° C. to 150° C., and the moisture content of the dried green brick is controlled at less than 0.9 percent by weight.

6. The preparation method of claim 1, wherein a time of keeping a highest firing temperature of 1,210° C. to 1,230° C. is 12 to 20 minutes.

* * * * *